United States Patent
Hori et al.

(10) Patent No.: US 7,193,652 B2
(45) Date of Patent: Mar. 20, 2007

(54) DYNAMIC RANGE VIDEO RECORDING AND PLAYBACK SYSTEM AND METHOD

(75) Inventors: Koichiro Hori, Framingham, MA (US); Michael Hui, Framingham, MA (US)

(73) Assignee: Applied Vision Systems, Inc., Framingham, MA (US)

( * ) Notice: Subject to any disclaimer, the term of this patent is extended or adjusted under 35 U.S.C. 154(b) by 1057 days.

(21) Appl. No.: 10/085,955

(22) Filed: Feb. 28, 2002

(65) Prior Publication Data

US 2002/0118293 A1 Aug. 29, 2002

Related U.S. Application Data

(63) Continuation-in-part of application No. 09/640,405, filed on Aug. 17, 2000, now Pat. No. 6,985,185.

(60) Provisional application No. 60/149,237, filed on Aug. 17, 1999.

(51) Int. Cl.
*H04N 5/235* (2006.01)
*H04N 5/238* (2006.01)

(52) U.S. Cl. ........................ 348/362; 348/364

(58) Field of Classification Search .................. None
See application file for complete search history.

(56) References Cited

U.S. PATENT DOCUMENTS

| | | | |
|---|---|---|---|
| 5,247,367 A | 9/1993 | Lee | 358/213.19 |
| 5,283,655 A | 2/1994 | Usami | 348/257 |
| 5,404,162 A * | 4/1995 | Sass et al. | 348/86 |
| 5,420,635 A | 5/1995 | Konishi et al. | 348/362 |
| 5,448,293 A | 9/1995 | Kogane et al. | 348/229 |
| 5,488,389 A * | 1/1996 | Nakanishi et al. | 345/670 |
| 5,517,242 A | 5/1996 | Yamada et al. | 348/254 |
| 5,568,192 A | 10/1996 | Hannah | 348/222 |
| 5,657,402 A | 8/1997 | Bender | 382/284 |
| 5,793,422 A | 8/1998 | Mochizuki et al. | 348/296 |
| 5,831,676 A * | 11/1998 | Takahashi et al. | 348/362 |
| 5,920,657 A | 7/1999 | Bender | 382/284 |
| 6,061,092 A * | 5/2000 | Bakhle et al. | 348/243 |
| 6,546,156 B1 * | 4/2003 | Kanzaki et al. | 382/298 |
| 6,593,970 B1 * | 7/2003 | Serizawa et al. | 348/362 |
| 6,952,234 B2 * | 10/2005 | Hatano | 348/363 |

* cited by examiner

*Primary Examiner*—Tuan Ho
*Assistant Examiner*—Luong T. Nguyen
(74) *Attorney, Agent, or Firm*—Pandiscio & Pandiscio

(57) ABSTRACT

An improved method and system for capturing and displaying a series of successive video images using at least first and second different exposure times, so that first video images captured using said first exposure time occur alternately in said series with second video images captured using said second exposure time. The method employs a digital computer and a software program for generating and storing digital data representative of said first and second video images, and utilizing that digital data to selectively display (a) side-by-side reproductions of said first and second images or (b) reproductions of only said first or said second video images or (c) composite images derived from the first and second video images digital data.

15 Claims, 9 Drawing Sheets

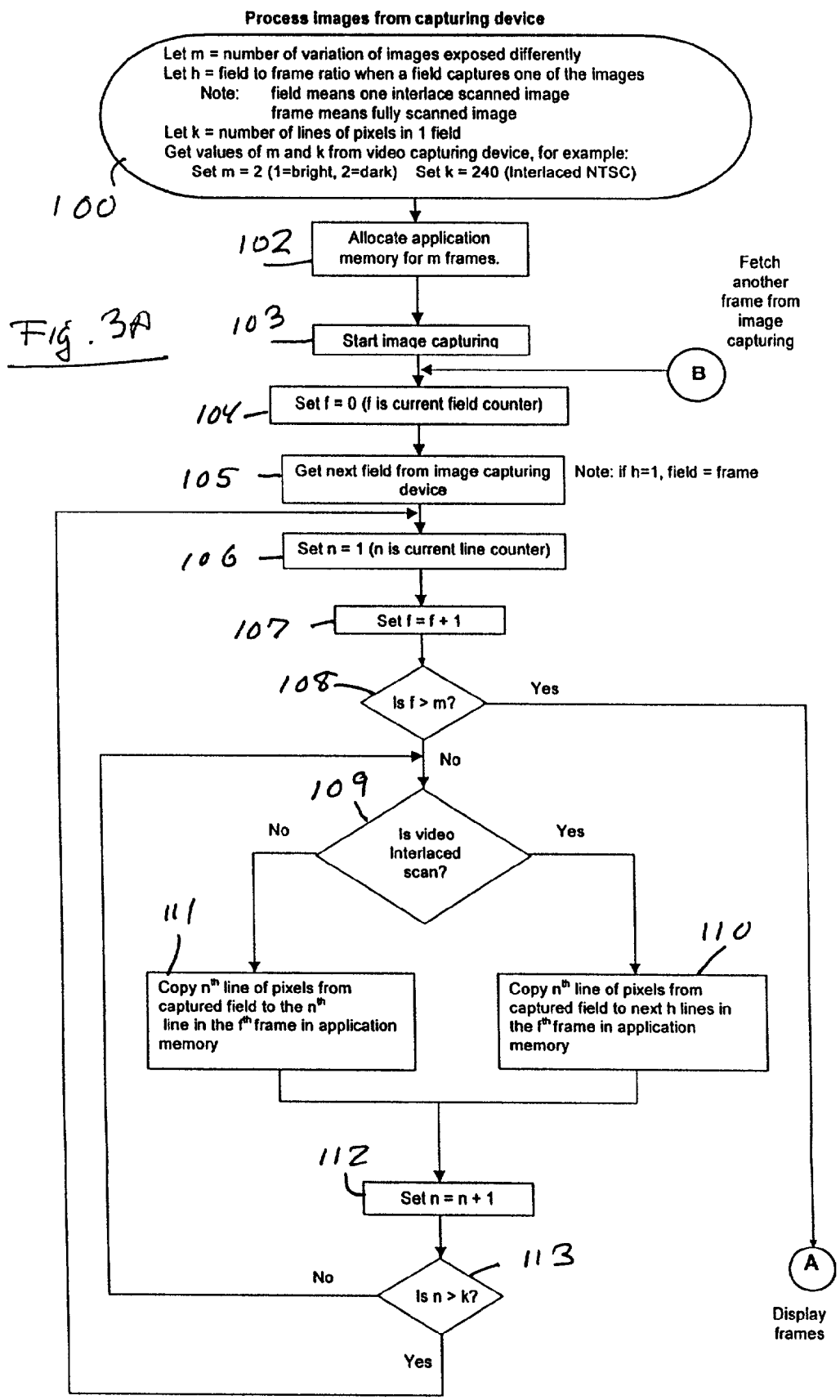

DYNAMIC RANGE VIDEO RECORDING AND PLAYBACK SYSTEM AND METHOD

PRIORITY CLAIM

Figure 1:
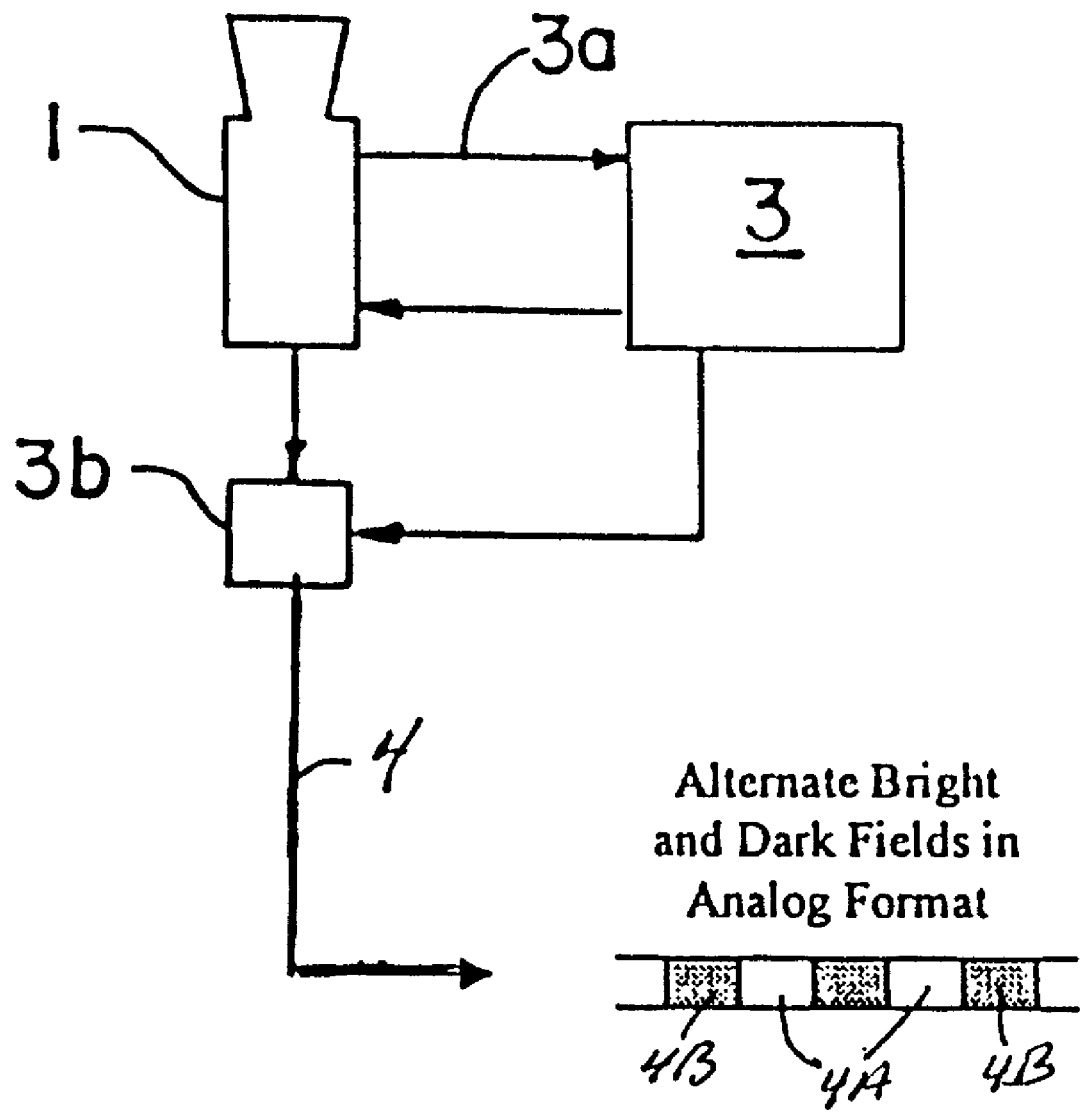

This is a continuation-in-part of U.S. patent application Ser. No. 09/640,405, now U.S. Pat. No 6,985,185 filed Aug. 17, 2000 by John Crawford et al., which application claims the benefit of U.S. Provisional Patent Application No. 60/149,237, filed Aug. 17, 1999.

INTRODUCTION

This invention relates to video systems that produce and record streams of video signals, notably but not exclusively video camera systems intended for surveillance and recording for security purposes, and more particularly to an improved form of the dynamic range video camera, recording system, and recording method described in International Patent Application PCT/US00/40662, published 22 Feb. 2001 as International Publication Number WO 01/13171 A1 (which corresponds to and claims the benefit of said copending U.S. patent application Ser. No. 09/640,405).

BACKGROUND AND PRIOR ART

Video camera systems are commonly employed for unattended recording of activities in a selected area. Some security applications, for example, have several video cameras connected to a recording system that periodically records a short period of video from each camera. Typically these cameras are designed to work in an auto-exposure mode, where a device called an electronic shutter varies the integration time of each video frame to match the ambient lighting conditions, or the camera is equipped with an auto-iris lens. In most cases, the cameras produce a continuous stream of standard video signals that contain two fields of video that are interlaced to create one frame of video. For example, the standard U.S. system, NTSC or RS-170 video, has 262.5 lines of video in one field interlaced with 262.5 lines in a second field, with the second set starting 1/60 sec. later than the first set. The video monitor or recorder used with these signals combines these fields alternately to produce a full frame of video for viewing. Other video systems exist that are called progressive scan systems. In these latter systems, a full frame of video is scanned without interlace, typically every 1/30sec.

In these systems, the video signals are represented by a voltage. In each field or frame, there will be a maximum voltage, representing the maximum amount of light the video system can convert into a signal, and a minimum voltage representing the minimum amount of light the system can reliably represent. In a scene viewed by the video camera, the image of the scene is converted to a video signal voltage representative of the scene with a range of voltages in between the maximum and minimum values. For a typical scene, and a particular value of auto-exposure, there may be portions of the scene that are too dark to contain any usable information, and other portions that are too light to be of use. In a surveillance application, for example, this can result in a situation where an essential part of the image is too light with a wash-out, or too dark, to be visible.

Heretofore one approach to overcoming the foregoing problem involves use of a combination dual exposure video camera. Combination dual exposure camera, systems comprise a camera that creates two different exposures of the same optical image via an electronic shutter and means for combining image data from both exposures into a single output field or frame. This results in a single image manufactured from the two different exposure parent images that spans a wider range of scene illumination values, but which is compressed within the voltage limits of a single video frame. An example of this type of camera system is disclosed by U.S. Pat. No. 5,420,635, issued May 30,1995 to M. Konishi et al. See also the following U.S. Patents for methods of creating high resolution images and/or compensating for variations in image luminance levels: U.S. Pat. No. 5,101,276, issued 31 Mar. 1992 to Y. Ohta et al.; U.S. Pat. No. 5,657,402 issued 12 Aug. 1997 to W. R. Bender et al.; and U.S. Pat. No. 5,920,657, issued 6 Jul. 1999 to W. R. Bender et al. A problem with the dual exposure image combining process is that although it expands the range of scene illumination values that are captured and utilized to manufacture the output fields or frames, it does so at the cost of reducing contrast from the resultant image by omitting various information contained in one or the other of the parent images. Also the combined image may be bleared if the object had movement. This omitted information is viewed in good faith as unimportant to the final image. However, such a judgment is not always proper or acceptable, particularly in video surveillance installations. Further, when such manufactured image fields are recorded, most of this dynamic range improvement is limited in post processing. This is because the information available in the manufactured image fields formed by combining signals no longer contains the full information present in the original pictures.

International Patent Application PCT/US00/40662, cited supra, discloses a video camera system and method whereby a stream of video signals is produced that defines a sequence of video fields or frames with video data representing at least two different exposure levels, with, for example, fields or frames of a first exposure level being interspersed among fields or frames of a second exposure level. Such video signals are utilized to generate a video display of the video data matching a particular set, or combination, of exposures. In addition to, or instead of, using the stream of video signals to provide a video display consisting of the optical images represented by selected video fields or frames, the system and method provides for recording the video signal output of the camera for subsequent use in generating a video display consisting of the optical image data represented by said selected video fields or frames. In other words, the display may be generated during or after recording. In comparison to the video signal output of a conventional dual exposure camera, the recorded stream of video signals of the system disclosed in International Patent Application PCT/US00/40662, comprising two or more pluralities of video fields or frames of different exposure levels, possesses a wider effective range of signal values due to the range of exposures recorded, covers a wider gamut of scene illumination, and has information of a higher dynamic range. By tailoring the number of different exposures to the camera and the video recorder, the full available dynamic range of the camera's video sensor may be preserved. Additionally, the system and method disclosed in International Patent Application PCT/US00/40662 offers the option of post-processing selected exposures to combine fields or frames of one exposure with fields or frames of other exposures, so as to achieve a result similar to that achieved with prior art methods for enhancing image resolution involving combining the video image data of two exposures into a single output field or frame.

OBJECTS AND SUMMARY OF INVENTION

A primary object of this invention is to facilitate use of the invention described in said International Patent Application PCT/US00/40662 by providing a method whereby the output of the video camera is applied to and used by a digital computer.

A more specific object of this invention is to provide a relatively low cost video system and method embodying the principles of the invention disclosed in International Patent Application PCT/US00/40662.

Another object is to provide an improved video system and method characterized in that a continuous stream of video signals that define video fields or frames representing the viewed scene or object is applied to a digital computer, and the latter is operated so as to provide a multi-image video display of the viewed scene.

A further object of this invention is to provide a video processing method and apparatus involving use of a digital computer, characterized in that a series of video image signals representing a sequence of first and second video fields or frames of a selected optical image is provided, with said first video fields or frames comprising data representing a first exposure level and said second video fields or frames comprising data representing a second greater or lesser exposure level, and said series of video image signals are processed by said digital computer so that each of said first video fields is linked to a different one of said second video fields or frames, and the video signals representing said linked first and second video fields are stored for subsequent use in generating a side by side display of the image data of said first and second video fields.

A further object is to provide a dynamic range video recording and playback method and apparatus characterized in that recording and playback involves a digital computer and a dedicated computer program for controlling the computer so that it operates to: (1) receive a stream of signals comprising first video field or frame signals in analog format representing images captured at one exposure level and second video field or frame signals in analog format representing images captured at a second exposure level, with the first and second video field or frame signals alternating in time sequence with said second video field or frame signals, (2) convert said analog signals to a digital format, (3) store said signals in digital format with said first video signals being linked to said second video signals according to the order in which they were generated, and (4) operate a display device in response to said signals so as to display a first image characterized by a first exposure level generated by said first video field or frame signals and simultaneously a second image characterized by a second different exposure level generated by said second video field or frame signals.

Another object of the invention is to provide an improved method and system for viewing and recording a scene with a video camera whereby a stream of video signals is produced that defines a sequence of video fields or frames with video data representing images recorded at two or more different exposure levels, and that stream of video signals is processed by a digital computer system to selectively generate a display of recorded images.

Still another object is to provide a novel computer program for operating a digital computer so that said computer can receive, process, store, access and convert alternating-occurring first and second video field or frame signals, with said first video field or frame signals comprising data representing images captured at one exposure level and said second video field or frame signals comprising data representing images captured at a second exposure level, said computer program being adapted to cause said computer to link each first video field or frame signal with the next-occurring second video field or frame signal, whereby said first and second video field or frame signals may be used to generate and display side-by-side optical images of different exposure values.

The foregoing objects, and other objects that are rendered obvious from the following description, are achieved by providing a video camera with an electronic shutter for capturing an optical image, and controlling operation of the shutter whereby the camera will produce a video signal output comprising a succession of video image field or frame signals representing the captured optical image, with a plurality of first video image fields or frame signals constituting data representing the captured optical image at a first exposure level and a plurality of second video image field or frame signals constituting data representing the captured optical image a second exposure level different from the first exposure level, with the first video image field or frame signals occurring alternately in time with the second video image field or frame signals. Such video signal output is utilized by a digital computer and peripheral equipment controlled by the computer operating under the control of a dedicated computer software program. The computer program enables the computer to drive a display device so as to cause the latter to display side by side optical images represented by said first or second video field or frame signals. Concurrently with providing a real time display of captured optical images, the invention provides for recording, i.e., storing, the video signal output of the camera in a non-volatile storage device for archival purposes, whereby it is available for subsequent use in generating a video display of the optical image data represented by said first and second video image field or frame signals. In other words, the display may be generated during or after recording. The computer program also provides for processing and storing a stream of video signals representing images captured at three or more exposure levels, and generating a display of images captured at each of the three exposure levels. Also, although the camera may be operated so as to provide video image signals representing images captured at two or more exposure levels, it is not necessary that the display device be operated so as to display simultaneously video images for each of the two or more exposure levels. Instead the computer program provides the user with a choice—the display device may be commanded to display only images captured at a selected one of the two or more exposure levels, or it may be commanded to display multiple images representing images captured at each or only some of the two or more exposure levels. For example, in the case where images are captured at three exposure levels, the display device may display only two images side by side, with one displayed image representing an image captured at one exposure level and the other displayed image representing an image captured at one of the other two exposure levels. Other features of the invention are described or rendered obvious by the following detailed specification which is to be considered together with the accompanying drawings.

THE DRAWINGS

Figure 2:
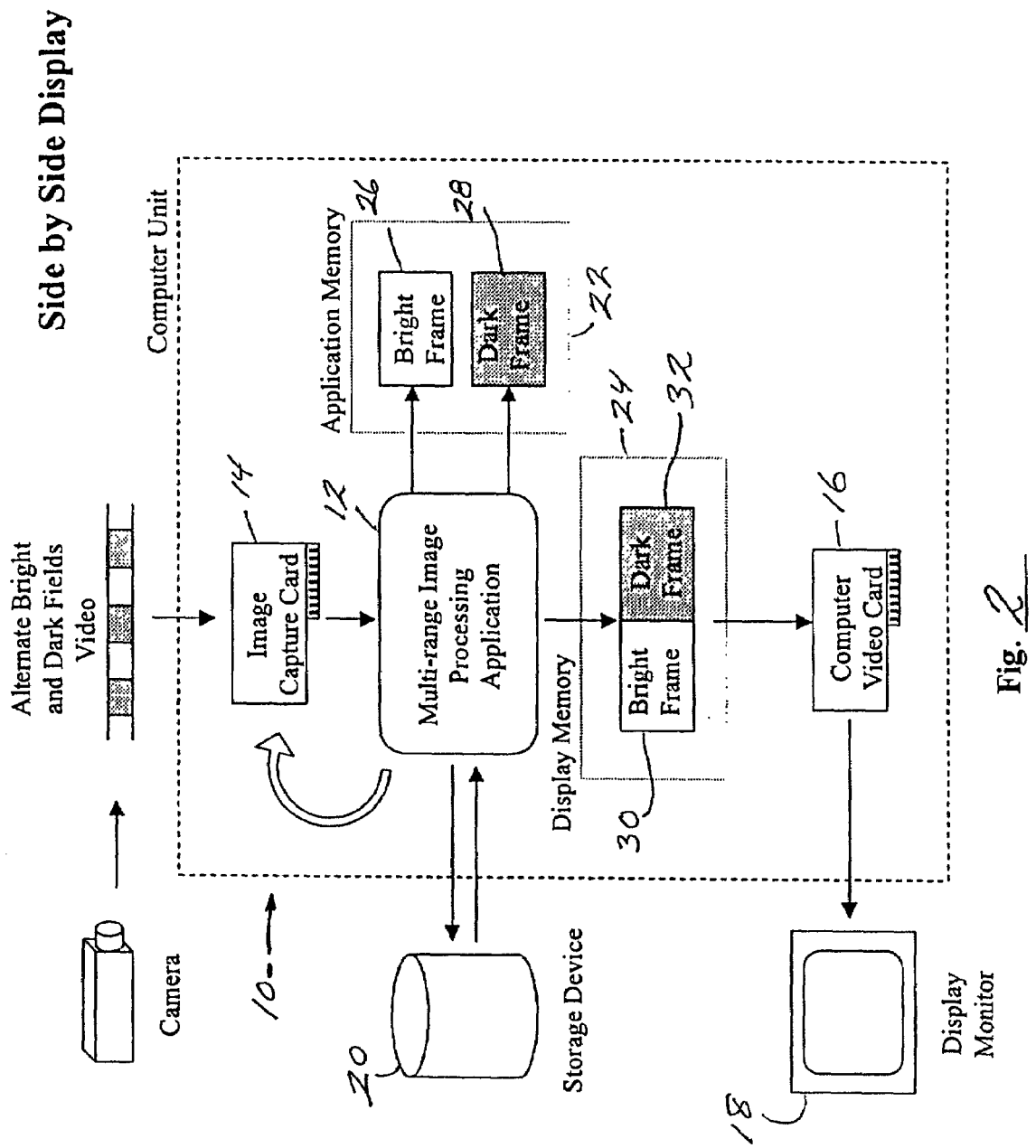
Figure 4:
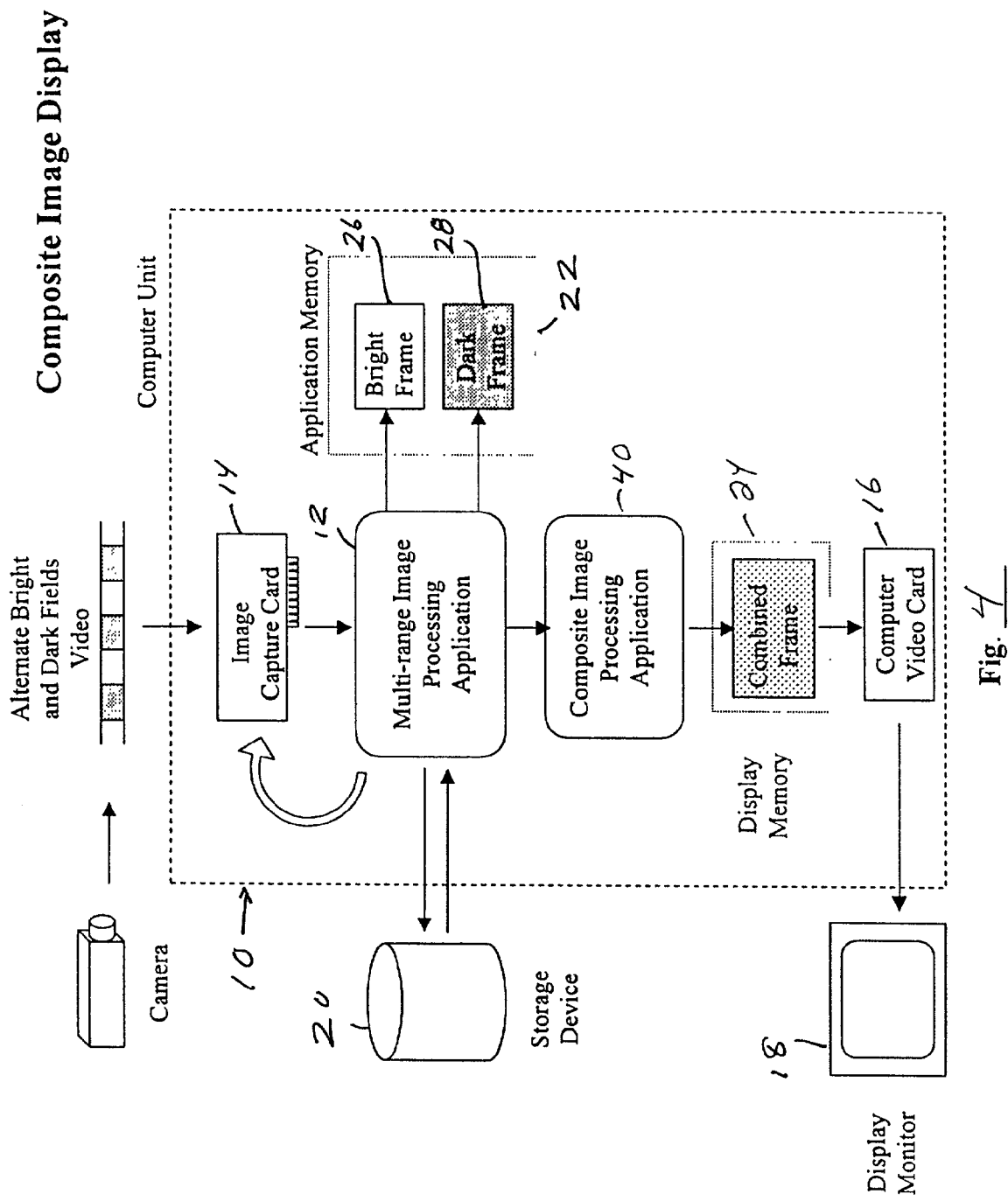
Figure 5:
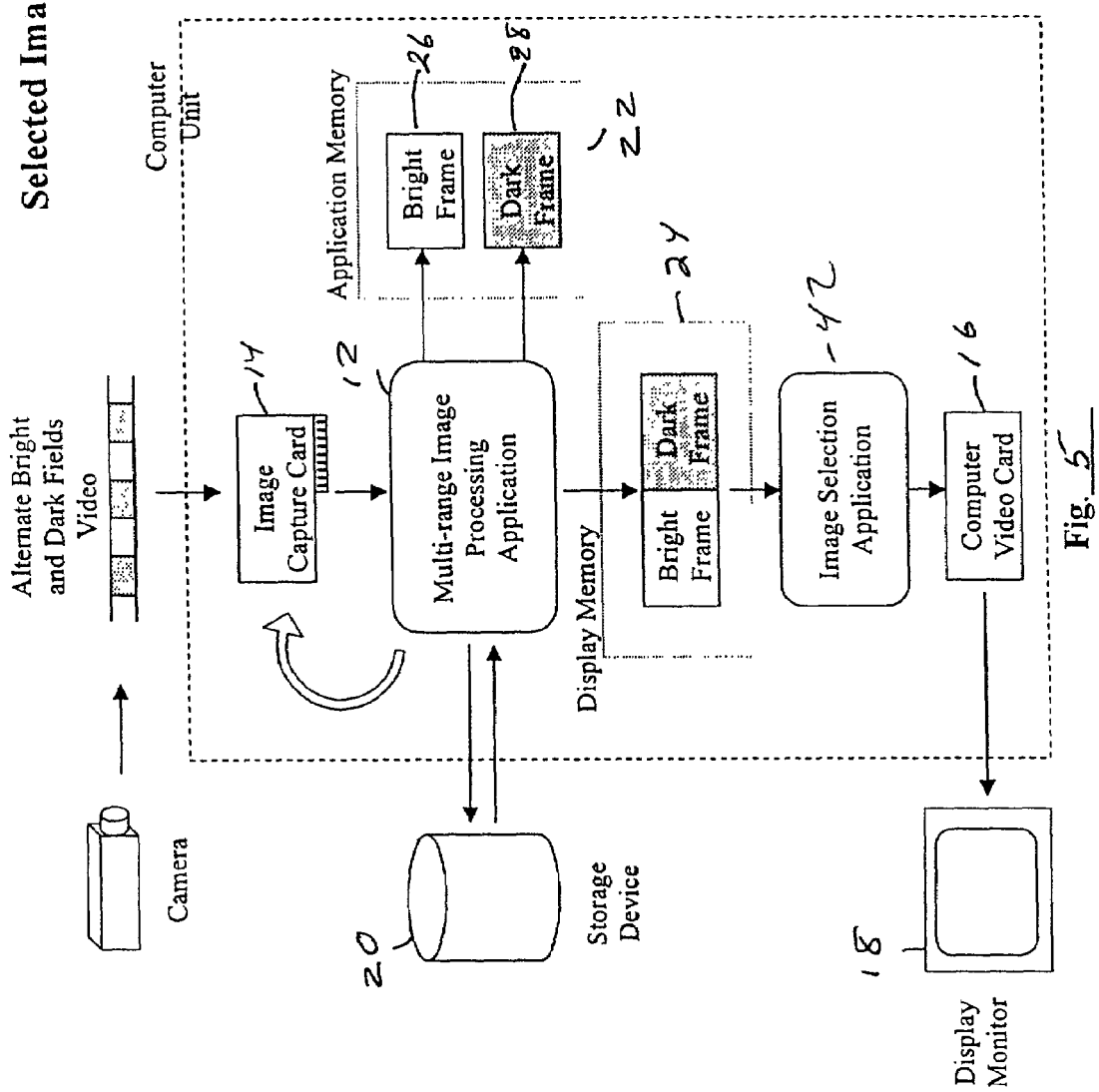
Figure 6:
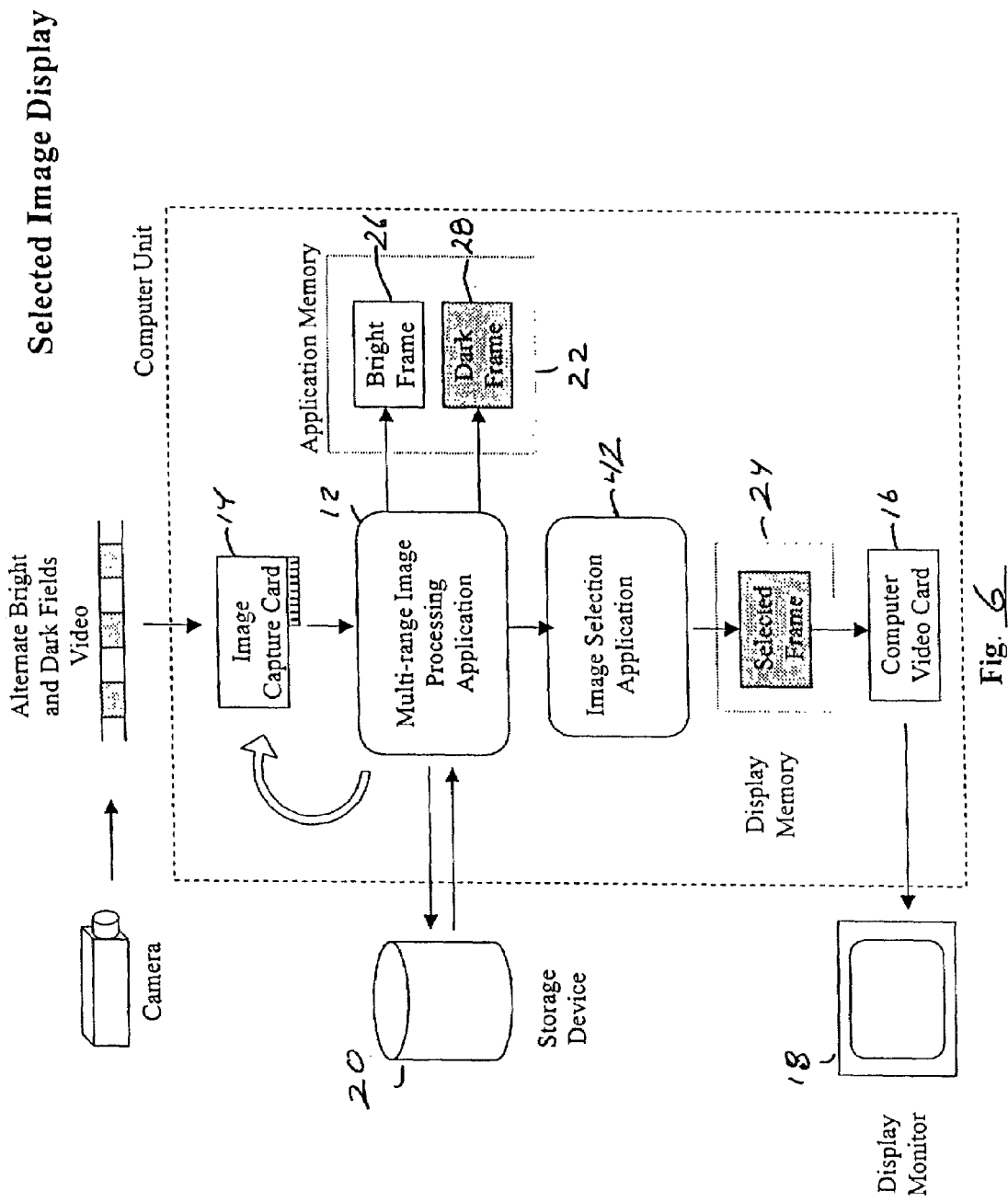

FIG. 1 schematically illustrates a video camera adapted for the present invention;

FIG. 2 is a block diagram illustrating components of a digital computer system according to a preferred embodiment of the invention;

FIGS. 3A–3D together constitute a flowchart illustrating the software provided for the preferred embodiment of the invention;

FIG. 4 is a block diagram illustrating a first modification of the invention for providing composite images that combine bright and dark images information; and FIGS. 5 and 6 are block diagrams illustrating two other modifications or embodiments of the invention that permit selective display of bright or dark image frames.

In the several figures, like numbers are intended to designate like components and like schematic representations.

DETAILED DESCRIPTION OF THE INVENTION

FIG. 1 is a block diagram representation of a video camera 1 that comprises an image detector (not shown), e.g., in the form of a photoresponsive solid state image sensor, and a lens (also not shown) that images the scene on the image detector. The solid state image sensor may be a CCD, MOS or other like device. In the preferred embodiment of this invention, the camera is designed to produce two interlaced fields, field 1 and field 2, per frame, e.g., according to the standard U.S. video system, NTSC or RS-170 video. Camera 1 also contains an electronic shutter (not shown). The use of solid state image sensors provided with electronic shutters is well known, as demonstrated by the following U.S. Pat. No. 5,793,422, issued 11 Aug. 1998 to T. Mochizuki et al.; U.S. Pat. No. 5,448,293, issued 5 Sept. 1995 to H. Kogane et al.; U.S. Pat. No. 5,410,349, issued 25Apr. 1995 to H. Tanigawa et al.; U.S. Pat. No. 5,283,655, issued 1 Feb. 1994 to M. Usami; U.S. Pat. No. 5,247,367, issued 21 Sept. 1993 to J. Lee; U.S. Pat. No. 5,157,502, issued 22 Oct. 1992 to T. Nakajima et al.; U.S. Pat. No. 5,075,775, issued 24 Dec. 1991 to Y. Kawaoka et al.; U.S. Pat. No. 4,875,100, issued 17 Oct. 1989 to K. Yonemoto et al; and U.S. Pat. No. 4,743,778, issued 10 May 1988 to N. Takatsu et al. To the extent that they are relevant, the teachings of those patents are incorporated herein by reference.

The electronic shutter of camera 1 is connected to a controller 3 that regulates the integration time of the camera's image detector during each field interval. The camera provides a synchronizing signal to the controller 3, as represented at 3a, so that the controller will cause the camera's electronic shutter to vary the exposure time for each field, i.e., regulate the integrating time of the camera's image detector in synchronism with each video field. During field 1 the controller sets the integration time to a predetermined slow speed, for example, a relatively long exposure time of $\frac{1}{60}$ second. During field 2 the controller sets the integration time to a predetermined fast speed, for example, a relatively short exposure time of $\frac{1}{2000}$ second. The electronic output of the camera appearing on output line 4 is a stream of analog video image signals containing data representing the field 1 and field 2 images. More specifically, the analog video image signals contain data representing a continuous sequence of relatively bright fields, as represented schematically at 4A, produced as a result of relatively long exposure times (e.g., $\frac{1}{60}$ second) alternating with relatively dark fields, as represented schematically at 4B, produced as a result of relatively short exposure times (e.g., $\frac{1}{2000}$ second).

As an optional modification described in greater detail hereinafter, a field code unit 3b may be adapted to add a field code (and other data codes as desired by the user) to the camera's output video signal. The field code unit may be provided as a separate device interposed between the camera and the computer system as illustrated in FIG. 1, or it may be incorporated as an integral part of the camera or the total system.

The present invention provides a system and method for recording and displaying the images represented by the signal output of camera 1 that is implemented as a computer program on a digital computer system. Referring to FIG. 2, the invention utilizes a conventional commercially available digital computer system 10. Although not shown, it is to be understood that such a computer essentially comprises a processor that retrieves and executes software program instructions stored in a storage means and also may control other components that form part of or are connected or coupled to the computer. The storage means of the computer functions to store program instructions and data. The storage means may comprise temporary storage means, such as random access operating memory, for storing instructions and data for immediate use or short term use, and also non-volatile storage means such as a computer disk drive or magnetic tape recorder for long term storage of computer programs and data. Preferably the computer program embodying the invention is stored on a hard disk that forms part of the computer system 10 and is automatically read into random access operating memory when the computer is activated. The computer program of this invention also may be stored permanently in read-only memory embodied in the computer system. As a further alternative, the computer program may be stored on a removable storage medium such as a CD and read into operating memory on operator command. In FIG. 2, the central processor, the above-described storage means, and the software program embodying the invention are represented generally at 12 as "Multi-range Image Processing Application".

The computer system also includes an input image capture card 14 (identified sometimes as a "frame grabber") that receives video information from an input device and translates it into computer readable digital data format. In this case image capture card 14 receives a stream of analog video image signals from video camera 1 and converts the analog video image signals to a digital data format. It is to be noted that the input video image signals need not be inputted to the video capture card directly from a video camera, but may be inputted instead via an intermediate device, e.g., a video tape recorder and video camera multiplexer that may form part of or be a separate device coupled to the camera. The computer further includes a computer output video card 16 that is adapted to received digital format video image signals and transform them into analog video signals suitable for driving a display device, such as a conventional video monitor, so as to present a video display as hereinafter described. The video monitor may be a fixed component of the computer system, as in the case of a laptop computer, or it may be a separate device as represented at 18 that is coupled to an outlet port of the computer. In the preferred embodiment of the invention, the computer system is connected to an external non-volatile storage device 20 that may take various forms, e.g. a disk drive or tape recorder. Storage device 20 provides for storage of recorded images for subsequent playback and/or for archival purposes.

Analog-to-digital image capture cards and digital-to-analog output video cards are all known to persons skilled in the art and a further detailed description of those devices is not believed necessary, particularly since they do not constitute the present invention.

Still referring to FIG. 2, the computer also includes an application memory buffer 22 and a display memory buffer 24. These may be portions of the computer's storage means allocated for buffer purposes pursuant to the computer program illustrated in FIGS. 3A–3D.

Figure 3B:
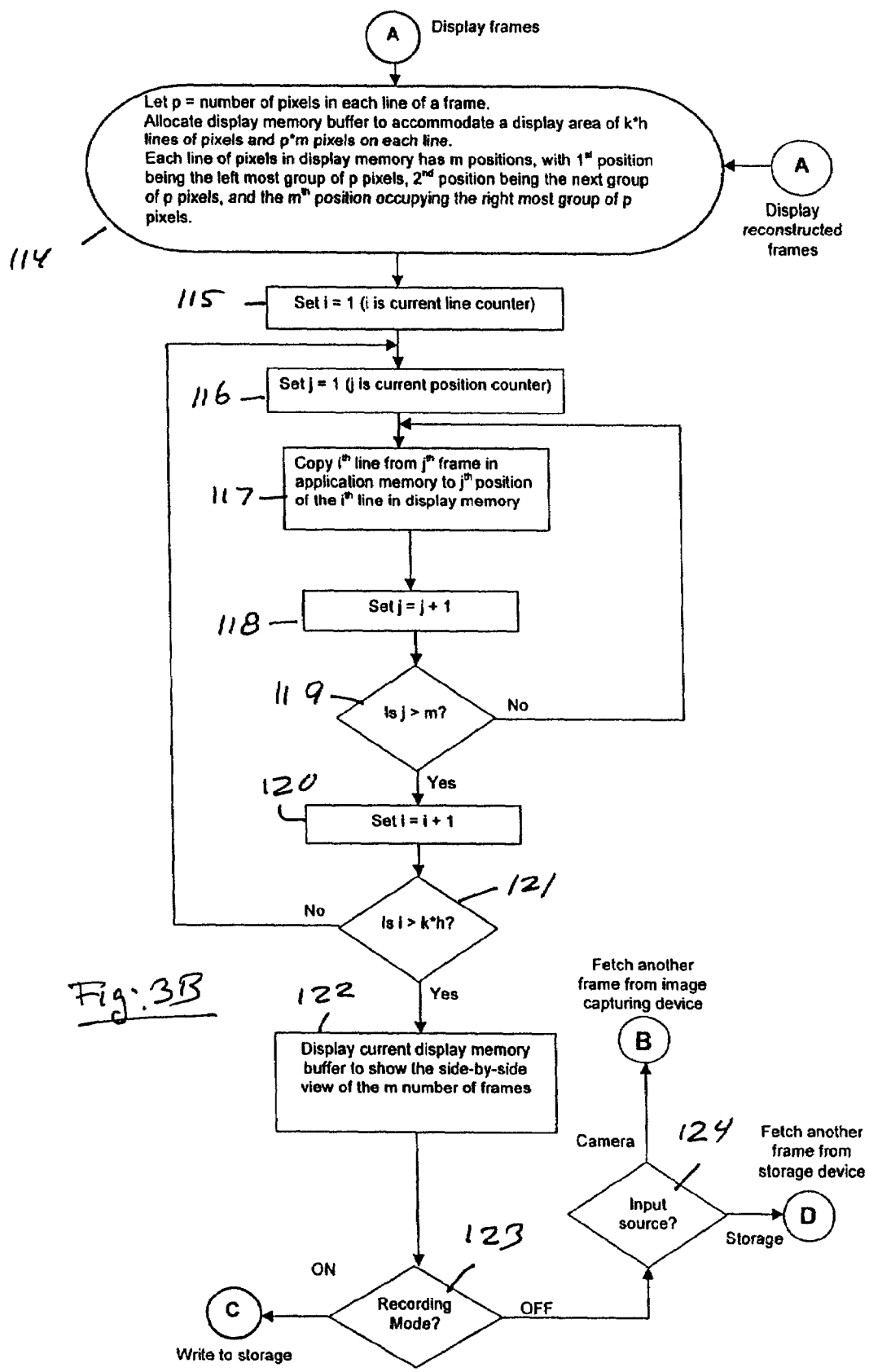
Figure 3C:
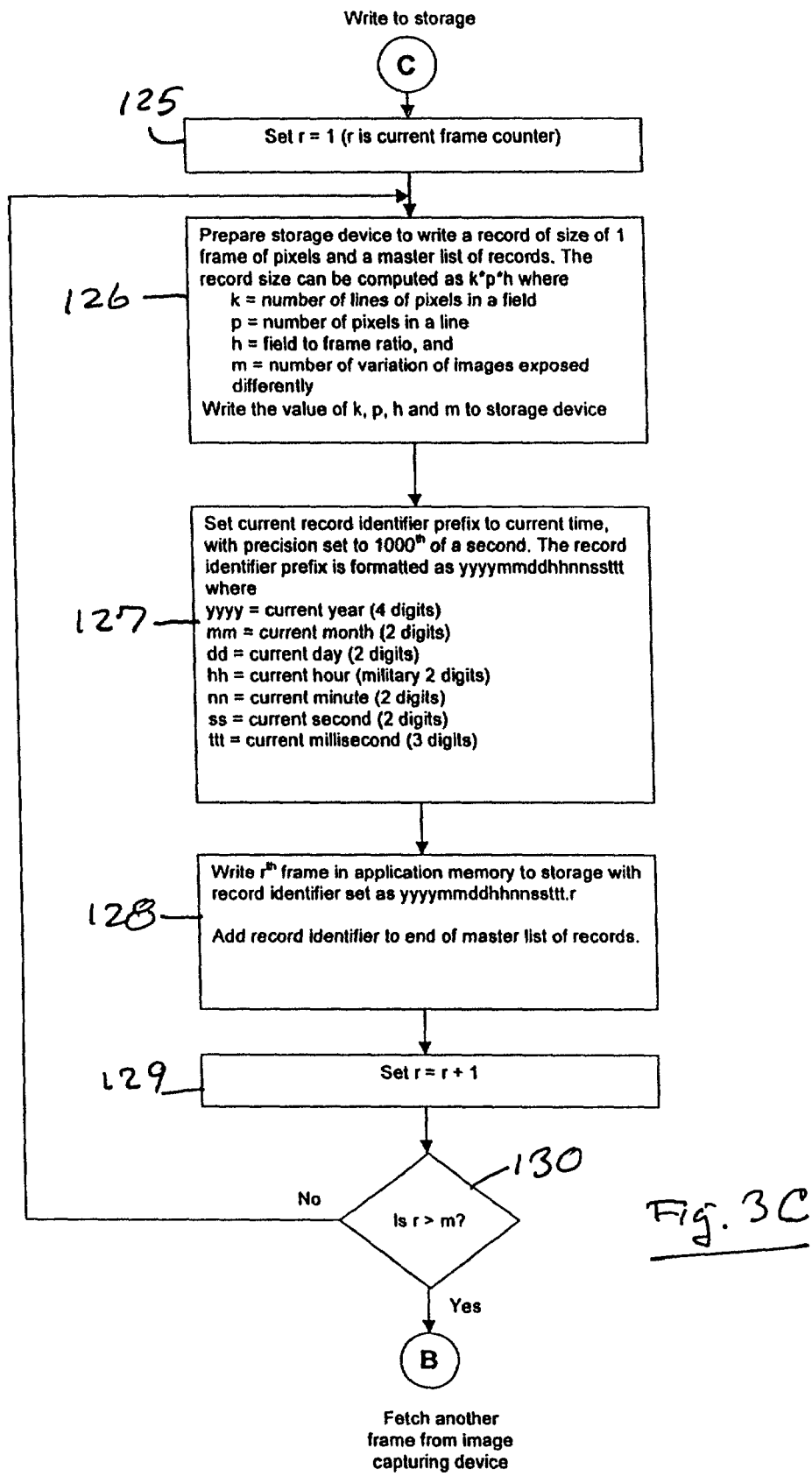
Figure 3D:
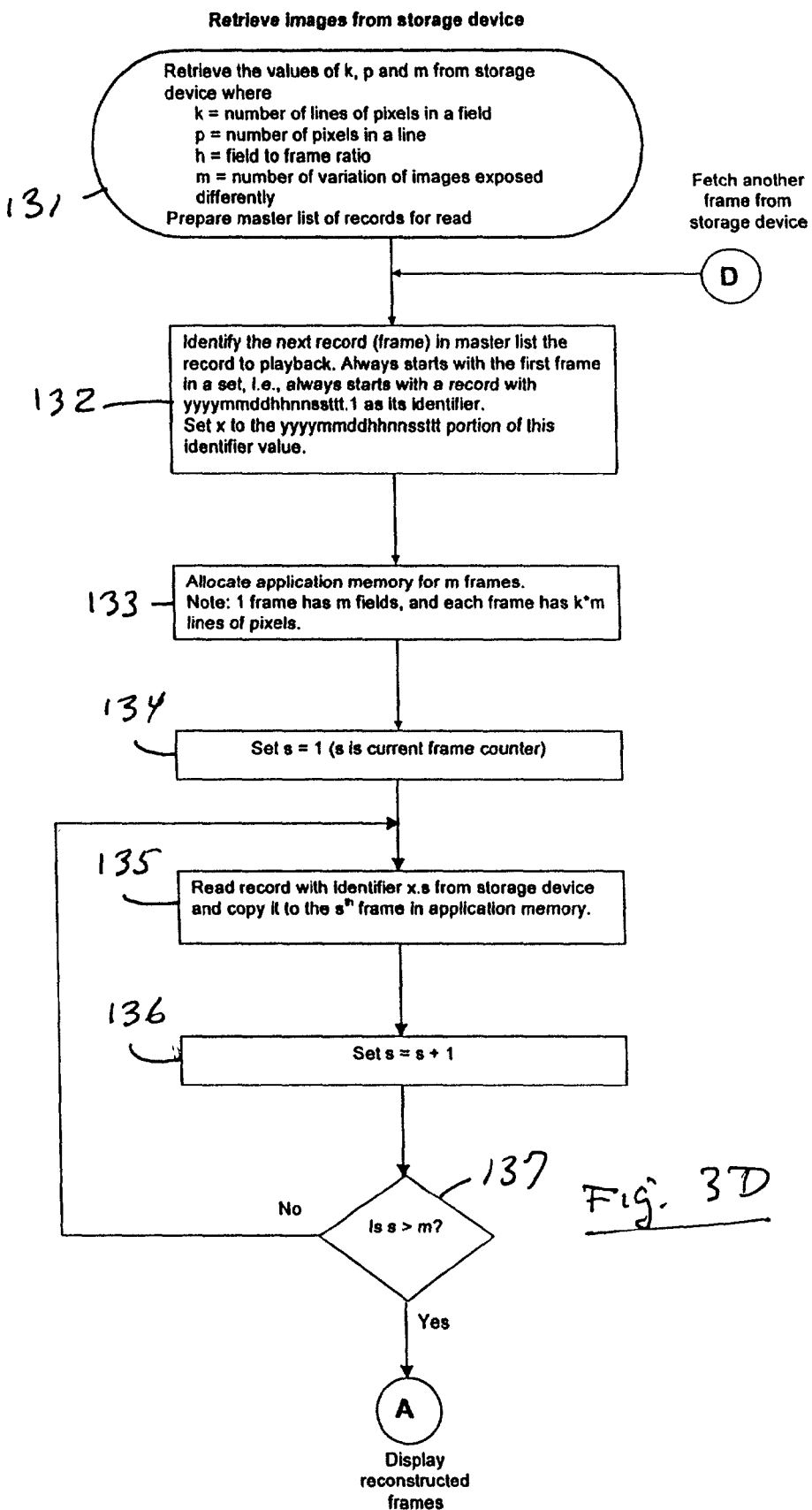

FIGS. 3A and 3B illustrate the steps commanded by a computer program of this invention for capturing, storing and displaying, in real or later time, images captured by camera 1. FIG. 3C illustrates the sequence of instructions or steps followed in writing video image records to storage, and FIG. 3D illustrates the steps that are executed in retrieving image records from storage display. The mode of operation of the program is described hereinafter in the context of camera 1 being operated so that it produces alternately occurring bright and dark fields as described above. However, it is to be appreciated that the computer program is designed to accommodate video image signals produced by programming the camera shutter controller 3 so that it will cause the camera to produce a series of fields or frames characterized by more than two different exposure levels, e.g., three different time exposures providing first images that are relatively bright, second images that are relatively dark, and third images that have a brightness intermediate that of the first and second images.

Referring now to FIGS. 3A and 3B, the output of the camera, comprising a stream of analog video image signals representing alternately occurring bright and dark fields, is converted to a digital format by the image capture card 14. Then the digital format signals are processed according to the software represented in FIGS. 3A and 3B. Accordingly, in step 100 the number of variations in exposure times "m" is set at a value of 2. Also in step 102 the field-to-frame ratio h is set to 2 since two interlaced fields are required to make one fully scanned interlaced image frame (note: in the case of a progressive scan, h=1 since, then a frame constitutes a single field). The software also lets "k" equal the number of lines of pixels in one field, and sets that value at 240 which is the value for one interlaced NTSC field without the vertical sync and blanking portions, i.e., the picture portion only. The values of m and k may be set automatically by information embedded in the camera's output video image signals, or may be set by presenting the user with a menu that provides a selection as to (1) the kind of imaging process (interlaced or progressive scan) used by the camera and (2) the number of different exposure times, i.e., the number of different exposure speeds, set by shutter controller 3. For the purposes of the image capturing process, a field may be considered as a coarsely scanned image and a frame as a fully scanned image.

In step 102, the software automatically allocates application memory for m=2 different exposure frames, i.e., frames resulting from two different exposure times, with the allocated memory being identified in FIG. 2 as bright field buffer 26 and dark field buffer 28. Then in step 103 the system is instructed to initiate the image capturing process, whereby an analog signal representing a frame (actually a field representing one interlaced image) is inputted from the camera (at B) and read into the video image capture card 14.

The program causes the computer to establish a field counter f (see step 104), and a line counter n (see step 106). In step 104, the field counter f is set to zero. Step 105 commands inputting the next field from camera 1. Step 106 sets the line counter to a value of 1, and step 107 advances the field counter by a count of one. In step 108, the field count f is compared to the number of different exposure times m, and if f exceeds m, an instruction is given to institute a Display Frame sequence of steps (see A on FIG. 3A). If f does not exceed m, in step 109 a determination is made as to whether the received video image is an interlaced scan image. If "yes", then in step 110 an instruction is executed to copy each line of pixels of the captured field to the application memory twice for each field (since h=2), so as to provide a full 480 line frame recorded in application memory. If step 109 provides a "no" decision, meaning that the video image is a progressive scan, i.e., the frame is a single field of 480 lines, then in step 110 the instruction is executed to copy the current line of pixels from the captured field to application memory without any doubling of lines.

In step 112, the line counter n is incremented by a count of one as a consequence of step 110 or 111, and step 113 determines if the line count n exceeds the number of lines k of pixels in a field. If n exceeds k in step 113 (which occurs when the number of lines totals 240 in the case of an interlaced field and 480 in the case of a progressive scan), a signal is set to reset the line counter to 1 in step 106. If n does not exceed k, a signal is sent to repeat step 109, whereupon another line of pixels is read to application memory.

FIG. 3B illustrates the sequence of steps that are executed in response to a Display Frames signal appearing at A (FIG. 3A). For this sequence of steps, two counters are established, a line counter i and a position counter j. In step 114, "p" represents the number of pixels in each line of a frame to be displayed, and display memory 24 is allocated to accommodate a display area of k*h lines of pixels and p*m pixels in each line. Also, each line of pixels in display memory is considered as having m positions. In the preferred embodiment where the camera produces alternating bright and dark fields, m has a value of 2. Accordingly, the first position in each line of pixels in display memory 24 is on the left and it comprises p pixels, and the second position is on the right and it also has p pixels. Essentially these are stored in display memory buffers 30 and 32. In other words, each line of pixels in display memory comprises p pixels of a dark frame in buffer 32 alongside of p pixels of a bright frame in buffer 30. In the case where the camera captures images at three different exposure values, the first and leftmost position in each line of pixels in display memory has p pixels reserved for one exposure level, the second and intermediate group of p pixels is reserved for the second exposure level, and the third and rightmost group of pixels in each line is reserved for the third exposure level, i.e., each line of pixels in display memory comprises 3 p pixels, representative of three different exposure times. Stated another way, the application memory 22 and display memory 24 would each comprise buffers of capacity for storing pixels according to three different exposure times.

Still referring to FIG. 3B, in steps 115 and 116 the line and position counters i and j are each set to a count of 1. Subsequently in step 117, the instruction is issued to copy the data representing a line of pixels from the application memory, e.g., from bright frame buffer 26, to a selected position in a line of the display memory, i.e., in buffer 30, after which in step 118 the current position counter is incremented by a count of 1, so that it now has a value of 2. Step 119 determines if the position count j exceeds the number of different exposure levels m. If j does not exceed m in value, which is the case when j=2, an instruction is issued to copy a line of pixels from application memory, i.e., from dark frame buffer 28, to the second position represented by j=2, i.e., to dark frame buffer 32. If j does exceed m, then in step 120 the line counter i is incremented by 1.

Thereafter, in step 121, a decision is made as to the value of i in relation to k*h. If the line count value i exceeds the value of k*h, indicating that 480 lines of pixels have been transferred to the display memory, the latter empties its contents to drive the monitor 18, as indicated at 122. If the line count does not exceed k*h, then steps 116–120 are repeated.

Simultaneously with displaying images represented by the video frame data contained in display memory, an inquiry is made in step 123 as to whether the same data should be transmitted to C for recording by non-volatile storage device 20. If not, a signal is generated to inquire at step 124 whether the next frame to be fetched for display is to be obtained from the camera, as indicated at B, or retrieved from the non-volatile storage device 20 as indicated at D.

To summarize the function of the software represented in FIGS. 3A and 3B, if the camera is operated so as to generate a series of signals representing alternately occurring relatively bright and relatively dark fields or frames in analog format, the image capture card operates to convert those signals to a digital data format, and the digital data representing the relatively bright frames is stored in buffer 26 and the digital data representing the relatively dark field frames is stored in buffer 28. In the case of interlaced fields, one bright and one dark, the number of lines representing a scanned field is doubled so as to provide an image frame of 480 lines for each exposure level stored in application memory 22. The digital data representing the relatively bright fields or frames and the digital data representing the relatively dark images are read out of buffers 26 and 28 and into display memory buffers 30 and 32 respectively in linked relation to one another in the sense that the transfer of digital data for a bright image is followed by the transfer of the digital data of the dark image that was captured immediately following the bright image. When all of the digital data representing a relatively bright image frame and the next succeeding relatively dark image frame has been read into display memory, that data is transferred in the same order to the output video card 16 which converts that digital data to analog video signals and directs those analog signals to display monitor 18 so as to cause the latter device to provide a display comprising side-by-side images derived from the relatively bright and relatively dark images captured by the camera. The dual images displayed by monitor 18 are composite images in the sense that one half of the 480 lines of pixels making up each displayed frame is a duplicate of a preceding line. This mode of reading in each scanned line of an interlaced image twice is necessary in order to meet the frame requirements of a monitor designed to display NTSC video. However, it is appreciated that the line doubling or repetition technique described above may be replaced by some other image interpolation method for achieving substantially the same result. It is to be appreciated that the digital data representing an interlaced field can be stored in application memory buffers 26 and 28 as well as non-volatile storage device 20 prior to the line doubling action, with the line doubling being accomplished later before the digital data is sent to display memory buffers 30 and 32.

FIG. 3C illustrates the schema for writing data representing captured images to storage device 20. Commencing with step 125, a frame counter r is provided and initialized with a count of 1. Then in step 126, the storage device 18 is prepared to write records of digital frame data read out of application memory 22 and also a master list of those records. In the context of FIG. 3C, each record contains the data for a single frame consisting of 480 lines of pixels, with the record size computed as the product of k, p and h, where k represents the number of lines of pixels in a field, p represents the number of pixels in a line, h represents the field to frame ratio, and m represents the number of variations in image exposure time. In the preferred embodiment of alternating bright and dark images, m=2. The value of k, p, h and m are recorded for each frame.

Step 127 provides instructions to assign an identifier prefix to each record, based on the current time, preferably to a precision of $\frac{1}{10000}$ of a second. The record identifier prefix is formatted on a selected year/month/day/time format as indicated in FIG. 3C. The purpose of assigning the identifier prefix is to facilitate subsequent readout of selected records from storage device 20. Step 128 orders the current frame in application memory to be read into device 20 with its assigned record identifier prefix, and also the addition of that record identifier to the master list of records. In the next step 129 the current frame counter r is incremented by a count of 1 frame. Then in step 130, the value of r is compared to m. If r exceeds m, an instruction is issued to fetch another frame from the image capturing device, more precisely, from application memory 22. If r does not exceed m, this signifies that the different exposure frame linked to the current frame remains to be read out, and consequently steps 126 to 129 are repeated to write the next frame on a time basis into storage. When this occurs, r will have a value in excess of 2, signifying that a bright frame and the next occurring (companion) dark frame have been written into storage, whereupon a command is then issued to fetch another frame from the application memory buffers 26 and 28. For clarity of description, each bright frame and the corresponding dark frame may be considered to be a set.

FIG. 3D illustrates the sequence of instructions for retrieving images from storage device 20. The first step 131 is to set the command for retrieval of the values of k, p and m from the storage device and to access the master list of records for readout. Then in response to the command to fetch another frame from the storage device (see step 124 in FIG. 3B), step 132 is executed wherein the next record (composite frame of 480 lines) in the master list is identified for playback. This step always starts with the first frame in a set, where the set denotes the number of images of different exposure values to be displayed simultaneously.

In step 133, application memory is allocated for m frames, with each frame having 480 lines of pixels. Then with the current frame counter s set to a count of 1, as prescribed by step 134, a record is read from the storage device and copied into the application memory (step 135). Next as shown in step 136, the count of current frame counter s is increased by 1. Thereupon in step 137, the current count of frame counter s is compared to the value of m. If the current count exceeds m, an instruction is issued to display the reconstructed frame, i.e., the retrieved set of bright and dark frames read out of the storage device, and that instruction is applied at A (see FIG. 3B) to generate a dual display as previously described. However, if s does not exceed m, an instruction is issued to repeat steps 135 and 136, whereupon another record (the companion record in a stored set of frames) is read out from the storage device to the application memory.

As noted above in relation to FIG. 2, the illustrated system may be modified by including the field code unit 3b for inserting a frame code to each video field. This option is used in the case where the camera is programmed to capture image fields (or frames in the case of progressive scanning mode) at three or more exposure levels, in order to be able to distinguish the image fields (or frames) according to their particular exposure levels. Insertion of field codes is not required in the case where only two exposure levels are used with the interlaced video mode, since then the video synchronizing signal at the beginning of a frame is used to distinguish the two different exposure interlaced fields from one another. The frame code essentially comprises a field code, and the field code unit may be adapted to add to each field such data as a date code, time code, frame serial number code, camera code (preferred, for example, where several cameras are used for surveilling multiple sites), other exposure information and/or other information supplied by the user, and that frame code information may be digitized as each captured field in analog format is converted to a digital format by image capture card 14. The frame code is inserted by field code unit 3b under control of the external controller 3.

The invention is not limited to NTSC interlaced video fields but can be adapted to handle other interlaced video systems in which the number of scanning lines per frame is more or less than 525, e.g., the European standard frame of 625 lines. The invention may also use a digital video camera in place of the analog video camera. Similarly it may use a digital video display device and method in place of an analog video display device. The digital video camera and digital video display device may be employed together in the same system, or only one of those devices may be used in practicing the invention. In the case where a digital video camera is used, image capture card 14 has no need to function as an A/D converter and instead its function is solely to convert the digital video image signal output of the camera to a computer readable digital data format. In this connection, it is to be noted that image capture cards are available commercially that are adapted to accept either analog or digital video image signals, with a switch being provided to allow selection of either type of input video image signal. If the monitor 18 is a digital video display device, the computer video card does not have D/A capability but instead its function is to generate output digital video signals in response to and representative of the digital format image information retrieved from bright and dark frame buffers 26 and 28.

It is contemplated also that the computer program may be adapted to offer the user the choice of displaying (a) composite images that are derived by combining bright and dark image information or (b) image frames of only a single exposure value, e.g., only bright or dark image frames.

FIG. 4 illustrates a modification of the invention for generating composite images. In this case the computer system includes a computer program identified as Composite Image Processing Application 40 which essentially combines the digital data representing bright and dark frames retrieved from application memory 22 by Multi-range Image Processing Application 12 to form combined (composite) image frames that consist of bright and dark image information. Those composite image frames in digital format are supplied via display memory 24 to video card 16, which in turn generates video signals that can be used to cause monitor 18 to generate displays of the composite images. Details of the construction of the computer program constituting the Composite Image Processing Application 40 are omitted since such programs are obvious to persons skilled in the art from the prior art relating to camera systems that are capable of taking two different exposure image frames and combining those images into a single composite image frame. The availability of composite images may be useful or desired for selected purposes.

FIGS. 5 and 6 illustrate how the invention may be modified to display only relatively bright or relatively dark images. In both embodiments, the line count doubling feature associated with step 110 of the software illustrated in FIGS. 3A–3D is operative to provide a full 480 line frame as described above. In the embodiment of FIG. 5, the computer system includes a computer program identified as Image Selection Application 42 which essentially selects to retrieve from display memory 24 and pass to the computer video card only bright image frames or dark image frames. Details of the construction of the computer program identified as Image Selection Application 42 are omitted since such program may take various forms obvious to persons skilled in the art. The essential thing is that Image Selection Application 42 allows the user to be able to command that either bright or dark images be retrieved from display memory 42 and displayed by the monitor. Thus the monitor will have a singular display of either bright or dark images.

FIG. 6 differs from FIG. 5 in that the Image Selection Application 42 is designed to modify the operation produced by the Image Processing Application 12 to the extent of selectively limiting retrieval of date representing bright or dark image frames from buffers 26 and 28, so that only bright image data or dark image data is transmitted to display memory 24. As with the FIG. 5 embodiment, the monitor will have a singular display of either bright or dark images.

Any one or more of the embodiments of FIGS. 4–6 may be provided without maintaining in the system the capability of providing a side-by-side display as provided by the embodiment of FIGS. 2 and 3. Preferably, however, the embodiments represented in FIGS. 4 and 5 (or 6) are combined with the embodiment of FIGS. 2 and 3 in a single system, with the operator having the option of selectively directing the system to cause the video monitor to generate the side by side of the embodiment of FIG. 2, and/or the composite singular display of the embodiment of FIG. 4, and/or the selective singular display of bright or dark images as made possible by either of the embodiments represented in FIGS. 5 and 6. With respect to FIGS. 5 and 6, the ability to selectively restrict the display to either bright or dark images is advantageous in the case where the user desires to study displayed images for details or where a hard copy printout is desired. The embodiment of FIG. 6 is preferred over that of FIG. 5 since it requires only bright or dark images to be retrieved from application memory 22, thereby reducing response time and also the amount of memory required to be allotted to display memory 24.

As with the systems shown in FIG. 2, the embodiments of FIGS. 4–6 may be practiced using either analog or digital cameras and display monitors, with the video capture card 14 and the computer video card 16 being compatible with the camera and monitor respectively as described above. Of course, video capture card 14 may be designed to process either analog or digital camera output video signals, and both capabilities may be incorporated in one card. Similarly video card 16 may be adapted to generate either an analog video signal for operating monitor 18 if the monitor is an analog video signal display device, or a digital video signal if the monitor is a digital video signal display device, and both capabilities may be incorporated in video card 16.

As is evident, the above-described embodiments of the computer system incorporating the present invention may be modified by adapting it to drive a printer in place of or in addition to video monitor 18, with the printer being driven so as to print out selected images, e.g., side-by-side still images of different exposure values, a composite image as provided by the embodiment of FIG. 4 or images of a singe exposure value as permitted by either of the embodiments of FIGS. 5 and 6.

It is to be understood that as used herein with respect to displaying images, the term "side-by-side" is to be interpreted as including other display formats, e.g., the images may be displayed one above the other or in some other arrangement according to the number and size of the contemporaneously displayed images. Also the displayed images may be of like size or one may be sized differently than the other displayed image(s).

Still other modifications and variations will be obvious to persons skilled in the art from the foregoing description and FIGS. 1–6.

What is claimed is:

1. Method of producing a video recording with improved dynamic range comprising:
   (a) providing a video camera capable of converting an optical image into a stream of analog video image signals defining a series of video fields or frames representing said optical image;
   (b) operating said video camera to capture an optical image viewed by said camera and simultaneously varying the amount of light received by said video camera during the time frame of each video field or frame representing said captured optical image so as to produce a stream of analog video image signals defining at least a plurality of first fields or frames representing a first exposure value of said captured optical image and a plurality of second fields or frames representing a second exposure value of said captured optical image, and said first fields or frames being interspersed among said second fields or frames in a discernible sequence;
   (c) providing a computer comprising video capturing means adapted to convert analog video signals that define a series of video fields or frames into digital video signals comprising digital data representative of said video fields or frames, an application memory for storing said digital video signals, a display memory for storing said digital video signals, signal processing means coupled to said display memory for converting digital video signals from said display memory into output analog video signals, and display means for generating a visual display in response and according to said output analog video signals,
   (d) applying said stream of analog video image signals to said video capturing means of said computer so that said analog video signals are converted to digital video signals representative of the fields or frames of the captured optical image; and
   (e) operating said computer so that (1) digital video signals are stored in said application memory in the order that they were generated from said analog video image signals but segregated according to the exposure values of the fields or frames which they represent, (2) said digital video signals are transferred from said application memory to said display memory according to the exposure values of the fields or frames represented by said digital video signals and in the order that said digital format data signals were generated from said analog signals, (3) said digital video signals are transferred from said display memory to said video signal processing means and converted thereby to output analog video signals, and (4) said output analog video signals are applied to said display means so as to cause said display means to generate a visual side by side display of captured images with different exposure values.

2. A method according to claim 1 wherein said camera is operated so that said stream of analog video image signals comprises first signals each defining a first field or frame representing a first exposure value of said captured optical image and second signals each defining a second field or frame representing a second exposure value of said captured optical image, with said first and second signals occurring alternately in said stream of signals, and further wherein said computer is operated so that said display means displays two video images in side by side relation with one another in response to said first and second signals, with one of said side by side video images being representative of said first exposure value and the other of said side by side video images being representative of said second exposure value.

3. A method according to claim 1 wherein said analog video signals comprise first signals each representative of a first field of an interlaced scanned image captured at a first exposure level and second signals each representative of the second field of an interlaced scanned image captured at a second different exposure level, and further wherein the number of lines of pixels in each of said fields is doubled when stored in said application memory.

4. Method of producing a video recording with improved dynamic range comprising:
   (a) providing a video camera capable of converting an optical image into a stream of video image signals defining a series of video fields or frames representing said optical image;
   (b) operating said video camera to capture an optical image viewed by said camera and simultaneously varying the amount of light received by said video camera during the time frame of each video field or frame representing said captured optical image so as to produce a stream of video image signals defining at least a plurality of first fields or frames representing a first exposure value of said captured optical image and a plurality of second fields or frames representing a second different exposure value of said captured optical image, and said first fields or frames being interspersed among said second fields or frames in a discernible sequence;
   (c) providing a computer comprising video capturing means adapted to convert video image signals that define a series of video fields or frames into digital video signals comprising digital data representative of said video fields or frames, an application memory for storing said digital video signals, a display memory for storing said digital video signals, video signal processing means coupled to said display memory for converting digital video signals from said display memory into output video signals, and display means for generating a visual display in response and according to said output video signals,
   (d) applying said stream of video image signals to said video capturing means of said computer so that said video image signals are converted to digital format video signals comprising data representative of the fields or frames of the captured optical image; and
   (e) operating said computer so that (1) said digital video signals are stored in said application memory in the order that they were generated from said video image signals but segregated according to the exposure values of the fields or frames which they represent, (2) said digital video signals are transferred from said application memory to said display memory according to the exposure values of the fields or frames represented by said digital video signals and in the order that said digital video signals were generated from said video image signals, (3) said digital video signals are transferred from said display memory to said video signal processing means and converted thereby to output video signals in a format suitable for driving said display means, and (4) said output video signals are applied to said display means so as to cause said display means to generate a display reproducing the images captured according to either or both of said first and second exposure values.

5. Method according to claim 4 wherein said video image signals comprise first signals each representative of a first field of an interlaced scanned image characterized by said first exposure value and second signals each representative of the second field of an interlaced scanned image characterized by said second different exposure value, and further wherein the number of lines of pixels in each of said fields is doubled when stored in said application memory.

6. Method of producing a video recording comprising:
(a) generating a stream of analog image signals defining a sequence of interlaced video fields representing a captured optical image, with said stream of analog image signals comprising first analog image signals defining first video fields of n lines of pixels representing the captured optical image at a first exposure level and second analog image signals defining second video fields of n lines of pixels representing the captured optical image at a second exposure level, with said first image signals occurring alternately with said second image signals in said stream;
(b) providing a computer comprising a central processor, image capturing means adapted to receive analog image signals that define a sequence of video fields representing an optical image and transform said analog image signals into digital field signals comprising digital data representative of said video fields, an application memory for storing said digital field signals, a display memory for storing said digital field signals, a video signal processing means coupled to said display memory for recovering digital field signals from said display memory and converting said digital field signals into output video signals having an analog format, display means for generating a visual display of captured images in response and according to said output video signals, and a stored application software program operable through said central processor for (1) directing said digital field signals to said application memory for storage according to the exposure values of the captured images represented by said digital field signals, (2) transferring said digital field signals from said application memory to said display memory in accordance with the exposure values of captured images represented by said digital field signals and in the order that said digital field signals were directed to said application memory for storage, with each of said digital field signals being transformed to define video fields of 2n lines of pixels, and (3) transferring stored digital field signals from said display memory to said video signal processing means so as to generate analog video signals in response and corresponding to said digital field signals; and
(c) applying said stream of analog image signals to said image capturing means so that (1) said first and second analog image signals are converted to first and second digital field signals representative of said first and second fields and said first and second exposure levels respectively, (2) said stored application software program causes said first and second digital field signals to be stored in said application memory in the order that they were generated from said analog image signals and according to the exposure values of said captured images, with each of said digital field signals stored in said application memory defining a video field of 2n lines of pixels, (3) said stored application software program transfers stored first and second digital field signals from said application memory to said display memory in the order that they were generated and according to the exposure values of said captured images; (4) said stored application software program causes said stored first and second digital field signals to be transferred from said display memory to said video signal processing means, whereby said video signal processing means converts said first and second digital field or frame signals to first and second analog output video signals respectively, and (5) said stored application software program causes said first and second analog output video signals to be applied to said display means so as to cause said display means to generate a simultaneous display of a first video reproduction of the captured optical image at a first exposure level and a second video reproduction of the captured optical image at a second exposure level, with each video reproduction comprising 2 n lines of pixels.

7. A method of recording and displaying video images comprising:
capturing successive first optical images according to a first exposure time and capturing successive second optical images according to a second exposure time, with said first optical images occurring alternately with said second optical images;
producing first and second analog image signals representative of said first and second optical images, with said first and second image signals occurring alternately in the order of capture of said first and second optical images;
applying said first and second analog image signals to a digital computer having an image capture card that is adapted to convert analog image signals to corresponding digital data image signals, a video card adapted to convert said digital data image signals into corresponding analog output video signals, and display means for generating visual video images in response to said analog output video signals; and
operating said digital computer so that in sequence (a) said first and second analog image signals are converted by said image capture card to first and second digital data image signals representative of said first and second optical images, (b) said first and second digital data image signals are stored in first and second separate buffers in said application memory, (c) said first digital data image signals are transferred in sequence from said first application memory buffer to a first image buffer in said display memory, (d) said second digital data image signals are transferred in sequence from said second buffer application memory to a second image buffer on said display memory, with each of said second digital data image signals being transferred in step with said first digital data image signals, (e) said first and second digital data image signals are transferred from said first and second image buffers to said video card and converted by said video card to corresponding first and second analog output video signals; and (f) said first and second analog output video signals are applied to said display means so as to cause said display means to generate a display comprising first and second video images in side by side relation, with said first video images corresponding in exposure to said first optical images and said second video images corresponding in exposure to said second optical images.

8. A method according to claim 7 wherein said digital computer is coupled to a write/read storage device, and further wherein said digital computer includes means for causing said first and second digital data image signals to be written into said storage device and means for causing said first and second digital data image signals to be read out of said storage device into said application memory, whereby analog output video signals suitable for producing a visual video display of recorded images represented by digital data image signals stored in said storage device may be generated by transferring said digital data image signals from said application memory to said video card via said display memory.

9. A method of recording and displaying a scene captured as a series of first and second alternately occurring analog video signals with each first analog video signal and the next occurring second analog video signal representing first and second interlaced fields of a video frame comprising n scanning lines of image information, with each of said first and second fields comprising ½n scanning lines and said first fields containing image information representing the scene captured according to a first length exposure time and said second fields containing image information representing the said scene captured according to a second different length exposure time, said method comprising the following steps:
(a) converting said first and second analog video signals to corresponding first and second digital format video signals each representative of a video field comprising ½n lines of pixels;
(b) converting said first and second digital format video signals to first and second composite digital video signals each representative of a frame of n lines of pixels, with ½ of said n lines of pixels being derived from the remainder of said n lines of pixels and said first and second composite digital video signals being representative of said scene captured according to said first and second length exposure times respectively;
(c) storing said first and second composite digital video signals in first and second buffers respectively; and
(d) utilizing said stored first and second composite digital video signals to generate first and second side-by-side video displays of the scene captured according to said first and second exposure times respectively.

10. Method of capturing and recording video images comprising:
(a) capturing a sequence of video images of a scene wherein said sequence comprises at least first video images of said scene captured at a first exposure level, second video images of said scene captured at a second different exposure level, and third video images of said scene captured at a third exposure level different than said first and second exposure levels, with said second and third video images being interspersed among said first video images in said sequence;
(b) generating a series of video image signals comprising first video image signals representative of said first video images, and second video image signals representative of said second video images, and third video image signals representative of said third video images;
(c) converting said first, second and third video image signals to first, second and third digital format data respectively;
(d) storing said first, second and third digital format data;
(e) retrieving said first and second digital format data;
(f) converting said first, second and third digital format data to first, second and third output video signals respectively;
(g) utilizing said first and second output video signals to generate side-by-side displays of said first and second video images respectively; and
(h) utilizing said third output video signals to generate a display of said third video images concurrently with and in side-by-side relation with said displays of said first and second video images.

11. A computer system for processing, storing and displaying video image information generated as a series of video image signals comprising first video image signals defining first fields or frames constituting data representing images captured at a first exposure level and second video image signals defining second fields or frames constituting data representing images captured at a second exposure level different than said first exposure level, with said first and second analog video image signals occurring alternately in sequence with one another, said system comprising:
an image capture card comprising image capturing means for receiving said series of video image signals and converting said first and second video image signals into first and second digital field or frame signals constituting data representative of the images captured at said first and second exposure levels;
an application memory;
a display memory;
a video card for converting said first and second digital field or frame signals into first and second output video signals respectively in a format suitable for driving a display device to provide a visual video display of the images represented by said fields or frames; and
processing means including a central processor for (a) sequentially storing said first and second digital field or frame signals in said application memory with said stored digital field or frame signals being categorized according to their exposure values, (b) sequentially moving said stored first and second digital field or frame signals from said application memory and sequentially storing said first and second digital field or frame signals in said display memory with said stored digital field or frame signals being categorized in said display memory according to their exposure values, and (c) transferring from said display memory to said video card in sequence each of said first digital field or frame signals and the second digital field or frame signals generated next in time relative to said each first digital field or frame signal, whereby to convert said first and second digital field or frame signals into first and second output video signals respectively in a format suitable for driving a display means so as to generate a display constituting side by side images with two different exposure values.

12. A computer system according to claim 11 further including a storage device, and further wherein said processing means comprises means for storing said digital field or frame signals in said storage device.

13. A computer system according to claim 12 wherein said processing means includes means for retrieving digital field or frame signals from said storage device and transmitting said retrieved digital field or frame signals to said application memory for playback purposes.

14. A computer system according to claim 11 wherein each of said first and second video image signals constitutes one field of a video frame that comprises n lines of pixels representing two interlaced fields, with each field comprising ½n lines of pixels, and further wherein said processing means modifies said digital field signals so that each of said digital field signals is stored in said application memory as representing n lines of pixels.

15. A computer system according to claim 11 wherein said series of video image signals comprises third video image signals defining third fields or frames constituting data representing images captured at a third exposure level different than said first and second exposure levels, said image capturing means of said image capture card is adapted to receive said series of third video image signals and convert said third video image signals into third digital field or frame signals constituting data representative of the images captured at said third exposure level, said video card is adapted to convert said third digital field or frame signals into third output video signals in a format suitable for driving a display device to provide a visual video display of the images represented by said third fields or frames, and said processing means is adapted to (a) store said third digital frame or field signals in said application memory in sequence with said first and second field or frame signals with said stored first, second and third digital field or frame signals being categorized according to their exposure values, (b) sequentially move said stored first, second and third digital field or frame signals from said application memory and sequentially storing said first, second and third digital field or frame signals in said display memory with said stored digital field or frame signals being categorized in said display memory according to their exposure values, and (c) transferring from said display memory to said video card in sequence each of said first digital field or frame signals and the second and third digital field or frame signals generated next in time relative to said each first digital field or frame signal, whereby to convert said first, second and third digital field or frame signals into first, second and third output video signals respectively in a format suitable for driving a display means so as to generate a display constituting side by side images with three different exposure levels.

* * * * *